United States Patent
Gaynes et al.

(10) Patent No.: US 8,026,730 B2
(45) Date of Patent: *Sep. 27, 2011

(54) PROCESS FOR MEASURING HEAT SPREADER TILT

(75) Inventors: Michael A. Gaynes, Vestal, NY (US); Edward J. Yarmchuk, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/843,211

(22) Filed: Jul. 26, 2010

(65) Prior Publication Data

US 2010/0289504 A1    Nov. 18, 2010

Related U.S. Application Data

(63) Continuation of application No. 11/739,897, filed on Apr. 25, 2007, now Pat. No. 7,764,069.

(51) Int. Cl.
G01R 27/26 (2006.01)
G01R 31/26 (2006.01)

(52) U.S. Cl. ............ 324/662; 324/686; 438/14

(58) Field of Classification Search ............. None
See application file for complete search history.

(56) References Cited

U.S. PATENT DOCUMENTS

| | | | |
|---|---|---|---|
| 5,273,442 A | 12/1993 | Laub | |
| 5,436,650 A | 7/1995 | Kobayashi et al. | |
| 5,444,389 A | 8/1995 | Hirae et al. | |
| 5,696,451 A | 12/1997 | Keirn et al. | |
| 6,492,829 B1 | 12/2002 | Miura et al. | |
| 6,709,967 B2 | 3/2004 | Evers | |
| 7,032,448 B2 * | 4/2006 | Hamamoto | 73/335.04 |
| 7,208,961 B2 | 4/2007 | Miyasaka | |
| 7,304,381 B2 * | 12/2007 | Rumer et al. | 257/717 |
| 7,405,106 B2 | 7/2008 | Maloney et al. | |
| 7,764,069 B2 * | 7/2010 | Gaynes et al. | 324/662 |
| 2003/0071347 A1 * | 4/2003 | Wang et al. | 257/706 |
| 2005/0134294 A1 | 6/2005 | Ebihara et al. | |

OTHER PUBLICATIONS

Ulaby, Fundamentals of Applied Electromagnetics, 2001, Prentice Hall, p. 170.00.

* cited by examiner

*Primary Examiner* — Jeff Natalini
(74) *Attorney, Agent, or Firm* — Connolly Bove Lodge & Hutz LLP; Daniel P. Morris, Esq.

(57) ABSTRACT

A process for measuring the thickness of an insulating material. The process includes providing a device used to measure capacitance, and electrically connecting the capacitance measuring device to a heat sink and an electrical, heat-generating component. The thickness of the insulating material is determined by measuring the capacitance of the insulating material according to tile formula: $B = \in_r \in_o A/C$, where B is the thickness of the insulating material, C is tile capacitance, A is the area of tile heat generating component, $\in_o$ is the permittivity of free space and $\in_r$ is the relative dielectric constant of the insulating material.

10 Claims, 5 Drawing Sheets

PROCESS FOR MEASURING HEAT SPREADER TILT

This application is a continuation of application Ser. No. 11/739,897, filed Apr. 25, 2007, now U.S. Pat. No. 7,764,069. The entire disclosure and contents of the above application are hereby incorporated by reference.

FIELD OF THE INVENTION

The invention is related to a process for measuring the thickness of an insulating material. The invention is also related to an apparatus and package structure that provides for capacitance measurements so that the thickness of the insulating material can be determined.

BACKGROUND OF THE INVENTION

Heat dissipation from active semiconductor devices has become a major technical challenge in achieving continued increases in performance and function. The thermal resistance between the backside of a flip chip and the heat spreader attached to it decreases as the bulk thermal conductivity of the thermal interface material (TIM) increases and as the bond line thickness decreases. Therefore, accurate measurement of the bond line over the entire chip area is essential to design and predict the thermal resistance. Conventional methods to measure bond line include cross-sectioning; laser profiling before and after lid attach; and lid removal after cure combined with z-scope measurement through the adhesive thickness.

The most common method is cross-sectioning which is both destructive and time consuming providing only a few points of measurement over the chip area. First the module is encapsulated to fill any open cavities in the package. After cure is complete, a diamond saw is used to cut the sample and expose a cross section that could be along an edge or diagonal. This sample piece is then encapsulated again to facilitate the hand grinding and polishing preparation that is required to reveal clean interlaces that allow measurement of the bond line. However, because of the large difference in the hardness of materials that include silicon, copper and polymers, materials are torn out or smeared during grinding and polishing therefore making it difficult to discern the exact interface. After the polishing sequences, the bond line dimension is measured at several points along the section line using an x-y microscope or digital image analysis. It takes several days to complete cross-sectional analysis on a few modules, so this method is viable for development work and failure analysis but not for real-time process characterization or line monitoring.

Z-scope measurements provide quicker turn around compared to cross-sectioning. Measurements are required in several spots to understand bond line variation over the chip area. One method is to dry place a heat spreader onto a chip and laser scan the lid surface: A thermal interface material is then applied to either the chip or heat spreader and the heat spreader is mated to the chip with a force and a dwell time. After the force is released, a second laser scan is made. The z-direction difference between the two scans is a measure of the bond line. The bond line is a difference of between 2000 and 2050 microns for only 50 microns. Typically this method is used to measure wet or uncured bond lines to make sure the process is in control. For processes that require pressure during cure, this method could only be used after cure as laser scanning of the heat spreader is not possible in a force loaded cure fixture.

A second z-scope method that is destructive entails removing the heat spreader after cure. If the thermal interface material debonds very near one of the interfaces, and near full thickness remains at the other surface, material can be scratched away in a small area and a z-focus microscope can be used to measure the bond line in several areas by focusing on the surface of the thermal interface material and then on the substrate to which it is attached. This method is reasonable and quick for bond lines that are relatively thick (>75 microns).

Flip chips attached to organic carriers are known to warp because of the CTE mismatch between silicon and laminate (2.8 vs 12-18 ppm/C). Thus the bond line between the chip and heat spreader is not uniform. Depending on the package, the chip bending ranges between 50 to 100 microns. Measuring the bond line over the entire chip area is not practical via cross sectioning.

In order to meet thermal resistance design targets, bond lines are decreasing to 25 microns and lower. Thus, it is becoming even more difficult to make accurate measurement of the bond line.

SUMMARY OF THE INVENTION

The invention is directed to a process for measuring the thickness of an insulating material. The process includes providing a device used to measure capacitance, and electrically connecting the capacitance measuring device to a heat sink and an electrical, heat-generating component. The insulating material is disposed between the heat sink and the heat-generating component. The thickness of the insulating material is determined by measuring the capacitance of the insulating material according to the formula;

$$B = \epsilon_r \epsilon_o A / C,$$

where B is the thickness of the insulating material, C is the capacitance, A is the area of the heat generating component, $\epsilon_o$ is the permittivity of free space and $\epsilon_r$ is the relative dielectric constant of the insulating material.

The process can be used to measure the bond-line thickness of a dielectric material of a semiconductor package. In such a case, the process includes providing a semiconductor package, which includes a dielectric material disposed between a semiconductor chip and a heat spreader, and providing a device used to measure capacitance. The capacitance can be measured by providing at least one lead of the capacitance measuring device in electrical contact with the heat spreader, and at least one other lead of the capacitance measuring device in electrical contact with the semiconductor chip.

BRIEF DESCRIPTION OF THE DRAWINGS

These and other features of the invention will become apparent upon consideration of the following detailed description of the invention when read in conjunction with the drawings, in which.

Figure 1:
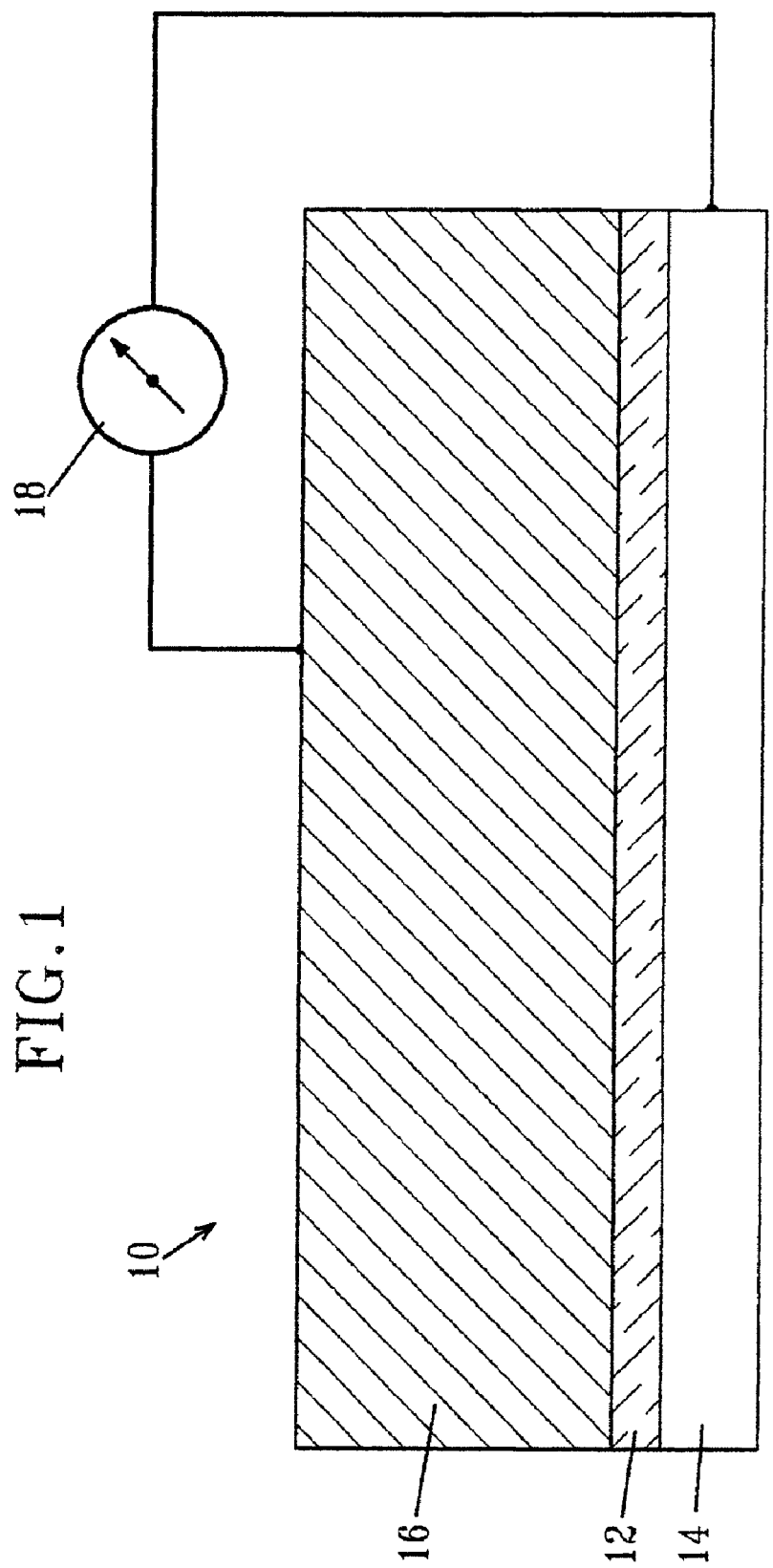
FIG. 1 depicts a cross sectional view of a semiconductor package of the invention.

One of ordinary skill in the art understands that the above described drawings are exemplary embodiments of the invention, and that the claimed invention is not limited by such exemplary embodiments.

DETAILED DESCRIPTION OF THE INVENTION

The invention is directed to a process for measuring the thickness of an insulating material. The process includes providing a device used to measure capacitance, and electrically connecting the capacitance measuring device to a heat sink and an electrical, heat-generating component. The insulating material is disposed between the heat sink and the heat-generating component. The thickness of the insulating material is determined by measuring the capacitance of the insulating material according to the formula;

$$B = \epsilon_r \epsilon_o A/C,$$

where B is the thickness of the insulating material, C is the capacitance, A is the area of the heat generating component, $\epsilon_o$ is the permittivity of free space and $\epsilon_r$ is the relative dielectric constant of the insulating material.

In one embodiment, the insulating material is a dielectric material and the heat-generating component is a semiconductor chip.

The process can be used to measure the bond-line thickness of a semiconductor package. In such a case, the process includes providing a semiconductor package, which includes a dielectric material disposed between a semiconductor chip and a heat spreader, and providing a device used to measure capacitance. The capacitance can be measured by providing at least one lead of the capacitance measuring device in electrical communication (for example, an alternating current signal contact) with the heat spreader, and at least one other lead of the capacitance measuring device in electrical communication with the semiconductor chip. The bond-line thickness (B) of the dielectric material is determined by measuring the capacitance of the semiconductor package according to the formula;

$$B = \epsilon_r \epsilon_o A/C,$$

where C is the capacitance, A is the area of the semiconductor chip, $\epsilon_o$ is the permittivity of free space and $\epsilon_r$ is the relative dielectric constant of the dielectric material.

In one embodiment of the semiconductor package, the at least one lead in electrical communication with the semiconductor chip is electrically connected to a conductive plate. At times, a chip carrier is disposed between the conductive plate and the semiconductor chip of the package. The chip carrier can include a plurality of electrical leads that electrically connect the conductive plate to the semiconductor chip.

In another embodiment of the semiconductor package, the heat spreader includes one or more conducting electrodes that extend from one surface to the opposite surface of the heat spreader. The conducting electrodes are electronically insulated from the heat spreader. The electronic connections of the package can include at least one electrical connection from the capacitance measuring device to the one or more conducting electrodes. The electronic connections of the package can also include at least one electrical connection from the capacitance measuring device to a region of the heat spreader that is electrically insulated from the one or more conducting electrodes. At times, the plurality of electrical leads that electrically connect the conductive plate to the semiconductor chip include carrier pads.

In another embodiment of the semiconductor package, at least one electrical connection from the capacitance measuring device to the one or more conducting electrodes includes a plurality of conducting electrodes. Preferably, each of the plurality of electrodes is in electrical communication with a single capacitance measuring device or multiple capacitance measuring devices.

Some of the commercial benefits of the capacitance measuring process described include the following. The process can be non-destructive. Also, the process provides relatively fast diagnostic information and is highly accurate. Accordingly, the process can be operated in real time before, during, or after the cure process. Also, with a modified heat spreader containing multiple conducting electrodes that are electrically isolated from the heat spreader, the bond-line can be mapped across most, if not all, areas of the semiconductor chip. In this manner, heat spreader tilt can also be measured. This method is very useful to help develop and optimize a heat spreader attachment process as well as provide process control data to support achieving thermal resistance targets.

FIG. 1 shows a cross section view of a semiconductor package 10 with a dielectric layer of thermal interface material 12 between the silicon chip 14 and a heat spreader 16. A capacitance meter 18 is connected to the silicon chip and the heat spreader allowing measurement of the capacitance across the dielectric layer. In FIG. 1, a direct electrical connection to the silicon chip 14 is shown, which may not always be possible or convenient.

The thickness of the dielectric layer, also referred to as the bond line, B, can be calculated using the following formula for parallel plate capacitance, $B = \epsilon_r \epsilon_o A/C$, where C is the capacitance, A is the area of the silicon chip, $\epsilon_o$ is the permittivity of free space (8.85e-12 Farads/meter), and $\epsilon_r$ is the relative dielectric constant of the dielectric layer. The relative dielectric constant is a material property that is often listed in data sheets provided by manufacturers.

Alternatively relative dielectric constant can be measured using a parallel plate apparatus in which the distance between the electrodes is known. The distance or space between the two electrodes is then filled with a dielectric material with an unknown relative dielectric constant. The measured capacitance thus allows one to calculate the relative dielectric constant using the parallel plate capacitance formula above. It is desirable that the bond line capacitance measurement be performed at the same frequency as that used by the process as the relative dielectric constant is often frequency dependent.

The actual frequency used in the process is not critical. For example, the measuring capacitance can be achieved using a commercially available meter (Agilent 426313) operating at 10 Khz.

Figure 2:
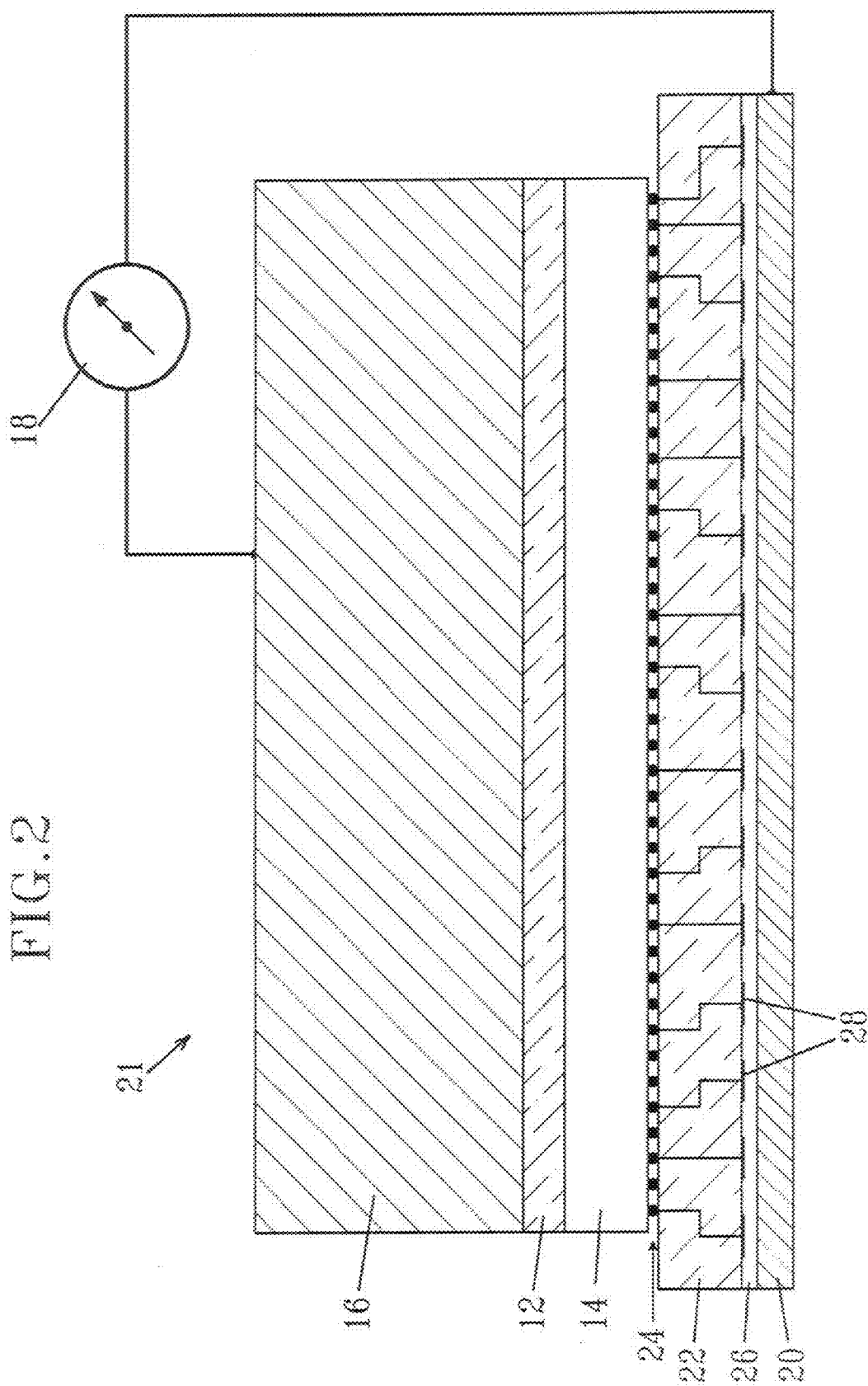
FIG. 2 depicts cross sectional view of another semiconductor package of the invention.

In another embodiment, FIG. 2 depicts package structure 21 in which one end of a capacitance meter 18 connects to a conductive plate 20 used to support the silicon chip. The silicon chip 14 can be shown soldered (depicted as solder halls 24) to a chip carrier 22. The chip carrier includes internal wiring that connects the chip circuitry to carrier pads 28 on the bottom of the carrier. As shown, a conductive layer 26 between the carrier pads 28 and the conductive plate 20 is used to provide adequate electrical contact to the silicon chip 14. For example, water can be used as the conductive layer. It is to be understood that one can also use an apparatus in which the carrier pads are in direct contact with the conductive plate.

Figure 3:
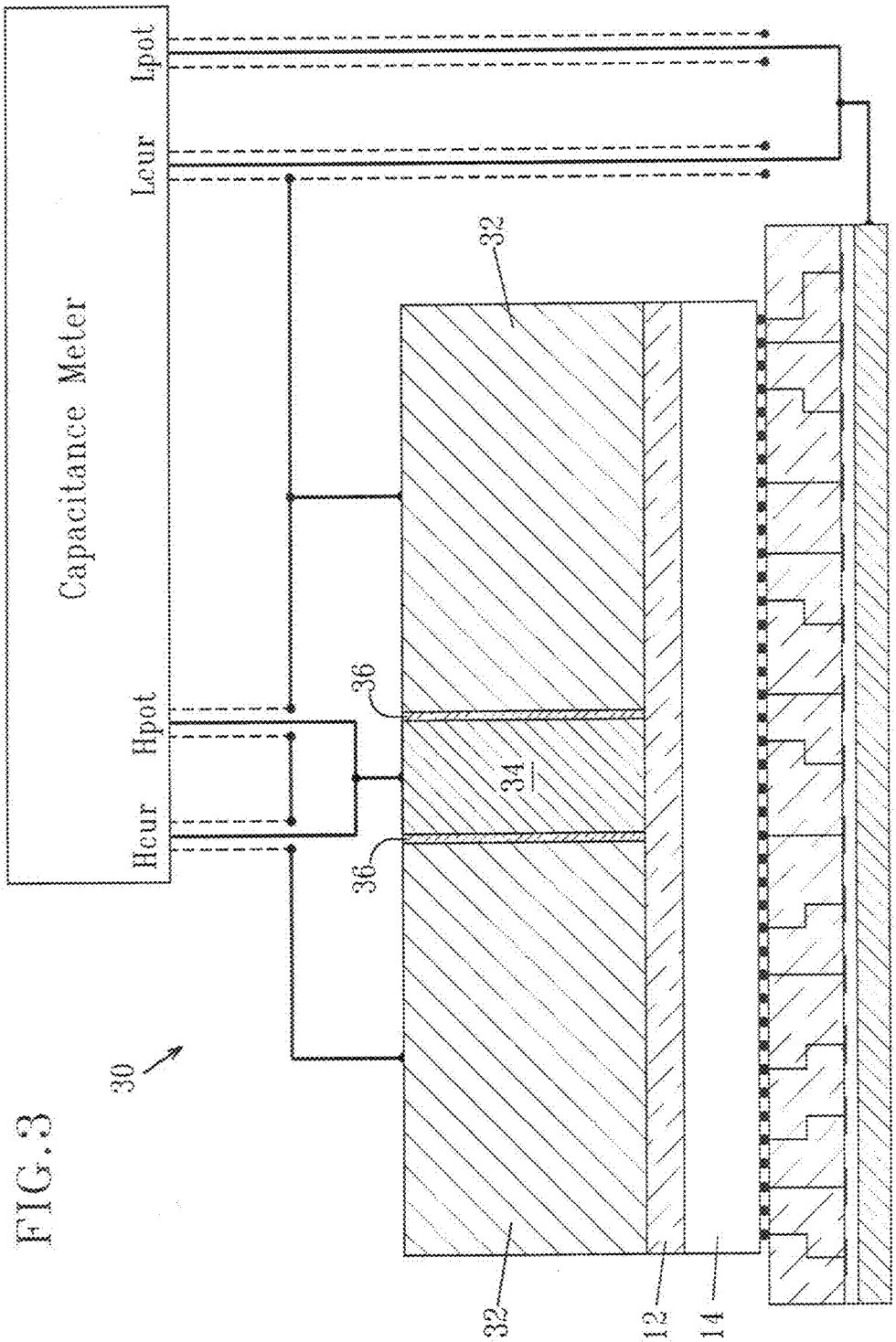
FIG. 3 depicts a cross sectional view of yet another semiconductor package of the invention.

In another embodiment, FIG. 3 depicts a package structure 30 in which a heat spreader 32 is modified to allow a localized region of the dielectric layer 12 to be measured rather than the entire silicon chip area. For example, one can drill a hole through a standard spreader at the desired location and insert a conducting electrode 34 that is electrically insulated 36 from the main spreader body 32. The surface can be machined or hand polished to remove excess electrode and insulating materials and cured adhesive, if used, to restore the smooth plane surface of the spreader. In this case the value of A in the parallel plate capacitance formula is the area of the conducting electrode. As shown in FIG. 3 a meter such as the Agilent 4263B that has four terminals measurement capability can be used. The outer shields on the four leads are connected together near the device under test and connected to the body of the spreader so that capacitance across the insulator 36 is not sensed. By using such a connection configuration, the stray capacitance contribution can be about 0.01 pF or less. For comparison, the capacitance of a typical 1 mm diameter conducting electrode, with a 25 micron bond line having a relative dielectric constant of 48 is about 14 pF.

Figure 4:
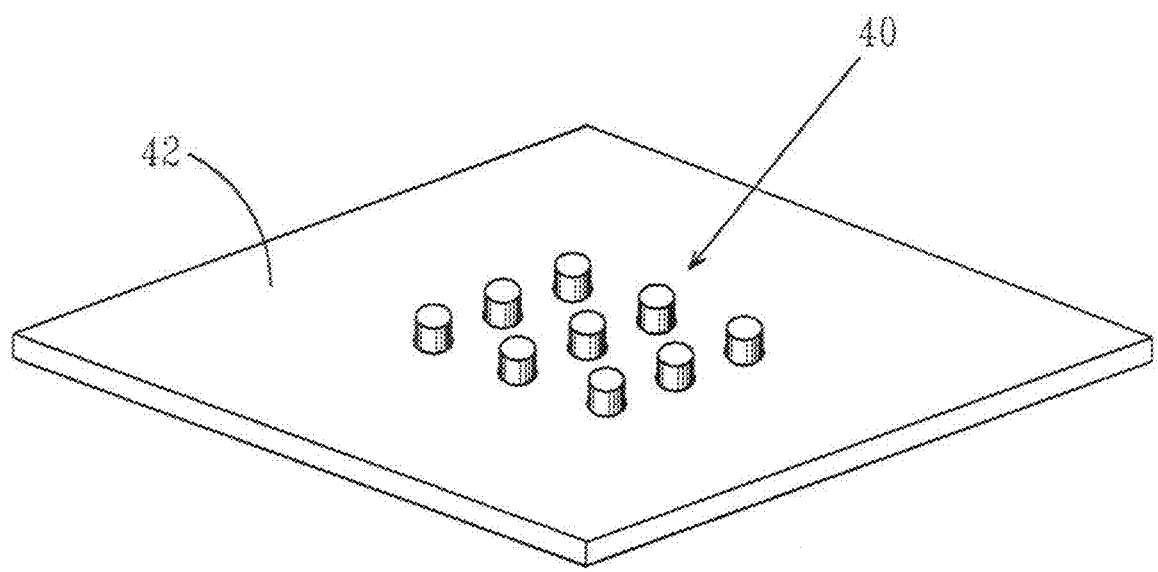
FIG. 4 depicts a perspective surface view of a heat spreader with a plurality of conducting electrodes.

In yet another embodiment, the apparatus of FIG. 4 provides for determination of the bond line thickness at various locations across the chip surface by placement of a plurality of conducting electrodes 40 into a heat spreader 42. Using multiple meters, sequentially attaching each electrode to a single meter, or relay switching multiple connections to a single meter allows determination of the bond line thickness at different locations on the chip.

Important mechanical properties, e.g., the bending stiffness and thermal expansion coefficient, of the electrode-modified heat spreaders described above are only minimally affected by the insertion of the electrodes. This is particularly true if the electrodes are made of the same material as the spreader. This can be important since curing and post-cure stressing usually involves substantial temperature excursions, and it is desired that the test units respond in the same way as standard product.

Figure 5:
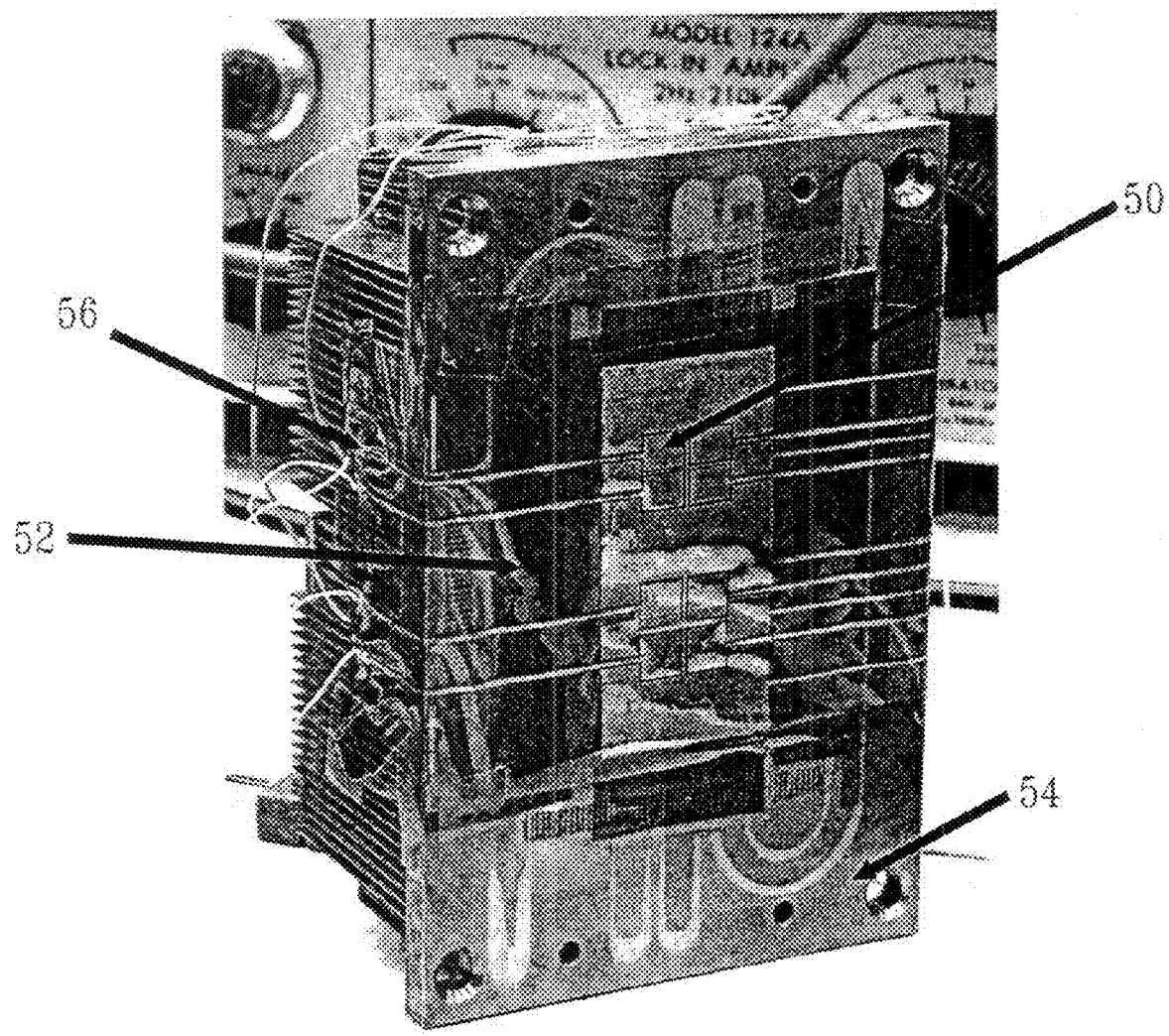
FIG. 5 is a photograph of a semiconductor package of the invention.

FIG. 5 illustrates an embodiment in which the conducting electrodes 50 are patterned onto a thin sheet 52 (such as copper Kapton) which is inserted between the spreader 54 and the TIM. Patterned leads 56 to each electrode are brought out laterally beyond the edge of the spreader 54 to allow connection to a capacitance meter.

The invention is also directed to a semiconductor package. The semiconductor package includes a dielectric material disposed between a semiconductor chip and a heat spreader in combination with a device used to measure capacitance. Also, at least one lead of the capacitance measuring device is in electrical communication with the heat spreader and at least one other lead of the capacitance measuring device is in electrical communication with the semiconductor chip.

In one embodiment, the semiconductor package that at least one lead in electrical communication with the semiconductor chip can be electrically connected to a conductive plate. Also, the semiconductor package can include a chip carrier disposed between the conductive plate and the semiconductor chip. The chip carrier includes a plurality of electrical leads that electrically connect the conductive plate to the semiconductor chip. The plurality of electrical leads that electrically connect the conductive plate to the semiconductor chip can include carrier pads.

In another embodiment, the semiconductor package includes a heat spreader that includes one or more conducting electrodes that extend from one surface to the opposite surface of the heat spreader. The conducting electrodes are electronically insulated from the heat spreader. The semiconductor package includes at least one electrical connection from the capacitance measuring device to the one or more conducting electrodes. The semiconductor package can also include at least one electrical connection from the capacitance measuring device to a region of the heat spreader that is electrically insulated from the one or more conducting electrodes.

We claim:

1. A process for measuring heat spreader tilt comprising:
providing an insulating material between a heat spreader and a semiconductor device;
the heat spreader containing a plurality of conducting electrodes extending from one surface to the other surface of the heat spreader;
electrically connecting a capacitance measuring device to the heat spreader and the semiconductor device; and
measuring a capacitance of the insulating material at a plurality of locations defined by the plurality of conducting electrodes.

2. The process of claim 1, further comprising:
calculating a thickness B of the in insulating material at a location from among the plurality of locations defined by the plurality of conducting electrodes according to the formula, $$B = \epsilon_r \epsilon_o A/C,$$

where C is the capacitance, A is the area of the heat generating component, $\epsilon_o$ is the permittivity of free space and $\epsilon_r$ is the relative dielectric constant of the insulating material.

3. The process of claim 1, wherein the measuring of the heat spreader tilt occurs before a cure process.

4. The process of claim 1, wherein the measuring of the heat spreader tilt occurs during a cure process.

5. The process of claim 1, wherein the measuring of the heat spreader tilt occurs after a cure process.

6. The process of claim 1, wherein a stray capacitance contribution is about 0.01 pF or less.

7. The process of claim 1, wherein the capacitance measuring device has a plurality of leads, and wherein each lead from among the plurality of leads has an outer shield.

8. The process of claim 7, further comprising connecting together the outer shields near the semiconductor device.

9. The process of claim 1, wherein the plurality of conducting electrodes are electronically insulated from the heat spreader.

10. The process of claim 1, further comprising providing at least one electrical connection from the capacitance measuring device to the plurality of conducting electrodes.

* * * * *